United States Patent
Leyendecker et al.

(10) Patent No.: US 6,965,726 B2
(45) Date of Patent: Nov. 15, 2005

(54) SLOW VIDEO DISPLAY TRICK MODE

(75) Inventors: Phillippe Leyendecker, Chateaugiron (FR); Franck Abelard, Chateaubourg (FR); Thomas Herbert Jones, Westfield, IN (US); Terry Wayne Lockridge, Indianapolis, IN (US)

(73) Assignee: Thomson Licensing SA., Boulogne Cedex (FR)

( * ) Notice: Subject to any disclaimer, the term of this patent is extended or adjusted under 35 U.S.C. 154(b) by 127 days.

(21) Appl. No.: 10/370,133

(22) Filed: Feb. 19, 2003

(65) Prior Publication Data

US 2004/0170384 A1 Sep. 2, 2004

(51) Int. Cl.$^7$ .................................................. H04N 5/91
(52) U.S. Cl. ........................................ 386/68; 386/67
(58) Field of Search ............................. 386/68, 67, 81, 386/82, 46–52, 4, 6, 7, 8, 40, 45, 124, 125

(56) References Cited

U.S. PATENT DOCUMENTS

2002/0167607 A1 * 11/2002 Eerenberg et al. ......... 348/439.1
2003/0076884 A1 * 4/2003 Lin et al. ................ 375/240.15

* cited by examiner

*Primary Examiner*—Robert Chevalier
(74) *Attorney, Agent, or Firm*—Joseph S. Tripoli; Harvey D. Fried; Robert B. Levy

(57) ABSTRACT

The invention concerns a method (200) and system (100) for performing a trick mode on a video signal containing a plurality of original pictures. The invention includes the steps of, in response to a trick mode command, selectively repeating (216) at least one of the original pictures to convert the video signal to a trick mode video signal having the original pictures and at least one repeated original picture and selectively displaying (218) at least a portion of the original picture and at least a portion of the repeated original pictures in accordance with a predetermined sequence to avoid a vibration artifact. Each original picture and each repeated original picture can contain at least two fields.

20 Claims, 5 Drawing Sheets

SLOW VIDEO DISPLAY TRICK MODE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The inventive arrangements relate generally to video systems and more particularly to video systems that record or play back digitally encoded video sequences.

2. Description of Related Art

Many televisions employ the interlaced scanning technique. Under this format, the video signal is typically divided into a predetermined number of horizontal lines. During each field period, only one-half of these lines are scanned; generally, the odd-numbered lines are scanned during the first field period, and the even-numbered lines are scanned during the next field period. Each sweep is referred to as a field, and when combined, the two fields form a complete picture or frame. For an NTSC system, sixty fields are displayed per second, resulting in a rate of thirty frames per second.

As a moving object moves across the screen in an interlaced scanning television, each field will only display a portion of the moving object. This partial display occurs because a field only displays every other horizontal line of the overall picture. For example, for a particular field n, only the odd-numbered horizontal lines are scanned, and the portion of the moving object that will be displayed in field n is the portion that is scanned during the odd-numbered horizontal line sweep for field n. The next field, field n+1, is created $1/60$ of a second later and will display the even-numbered horizontal lines of the picture. Thus, the portion of the moving object that is displayed in field n+1 is the portion that is scanned during the even-numbered horizontal line sweep for field n+1. Although each field is temporally distinct, the human eye perceives the sequential display of the fields as smooth motion due to the speed at which the fields are displayed.

If a viewer activates a trick mode while viewing interlaced video, the trick mode video signal may contain repeated non-progressive pictures. For example, if the viewer initiates a slow trick mode, each non-progressive picture can be repeated a predetermined number of times to create a slow motion effect. The display of each repeated non-progressive picture, however, is in accordance with the normal display of a non-progressive picture, i.e, the fields that make up the non-progressive picture are alternately displayed. As an example, if a non-progressive picture were to be repeated three times (and assuming that the top field is displayed first), the repeated display of the picture would follow this order: top field, bottom field; top field, bottom field; and top field, bottom field.

If a moving object appears in the pictures recorded under the interlaced scanning format, each field will display the moving object in one specific position. Thus, as these fields are alternately displayed during the slow motion trick mode, the moving object in the display rapidly moves from one position in the display to another; in effect, the moving object appears to vibrate. This phenomenon, commonly referred to as a vibration artifact, is created because the interlaced fields are temporally distinct, and the moving object appears in a different position for each field.

This problem is also present in certain televisions that include a deinterlacer. As is known in the art, a deinterlacer can construct complete frames from an interlaced field. Thus, a deinterlacer can construct complete frames out of the fields that comprise the repeated non-progressive frame. Nevertheless, these complete frames constructed from the interlaced fields will also be displayed in an alternate fashion thereby creating the possibility of the vibration artifact. In addition, this vibration effect appears in not only a slow trick mode but may also be present in any other trick mode in which non-progressive pictures are repeated, such as a freeze trick mode. Thus, it is desirable to eliminate the vibration artifact without increasing system costs or complexity.

SUMMARY OF THE INVENTION

The present invention concerns a method of performing a trick mode on a video signal containing a plurality of original pictures. The method includes the steps of in response to a trick mode command, selectively repeating at least one of the original pictures to convert the video signal to a trick mode video signal having the original pictures and at least one repeated original picture and selectively displaying at least a portion of the original pictures and at least a portion of the repeated original pictures in accordance with a predetermined sequence to avoid a vibration artifact. In one arrangement, each original picture and each repeated original picture can contain at least two fields. In another arrangement, the fields can include at least top fields and bottom fields, and the predetermined sequence can include the consecutive display of at least a group of top fields from the original picture and the repeated original pictures and at least a group of bottom fields from the original picture and the repeated original pictures. The trick mode command can be a slow motion trick mode command, including a forward or reverse slow motion trick mode command.

In one embodiment of the invention, the trick mode command can be a slow motion trick mode command, the group of top fields can contain a predetermined number of the top fields and the group of bottom fields can contain a predetermined number of the bottom fields. Each of the predetermined numbers can be equal to a denominator in a playback speed ratio for the slow motion trick mode command.

In another arrangement, the predetermined sequence can further include the consecutive display of the group of top fields for a predetermined number of times and the consecutive display of the group of bottom fields for the remainder of the trick mode command. Alternatively, the predetermined sequence can further include the consecutive display of the group of bottom fields for a predetermined number of times and the consecutive display of the group of top fields for the remainder of the trick mode command.

In another embodiment, the fields can include at least top fields and bottom fields, and the predetermined sequence can include the consecutive display of only one group among a group of top fields or a group of bottom fields. The trick mode command can also be a freeze trick mode command.

The present invention also concerns another method for performing a trick mode on a video signal containing a plurality of original pictures. The method includes the steps of, in response to a trick mode command, selectively repeating at least one of the original pictures to convert the video signal to a trick mode video signal having the original pictures and at least one repeated original picture and selectively displaying at least a portion of the original pictures repetitively for a predetermined number of times and a complementary portion of the repeated original pictures repetitively for the predetermined number of times to avoid a vibration artifact.

The present invention also concerns a system for performing a trick mode on a video signal containing a plurality of original pictures. The system can include a controller for reading data from a storage medium and outputting the video signal containing the plurality of original pictures and a processor. The processor can be programmed to, in response to a trick mode command, selectively repeat at least one of the original pictures to convert the video signal to a trick mode video signal having the original pictures and at least one repeated original picture and selectively display at least a portion of the original picture and at least a portion of the repeated original pictures in accordance with a predetermined sequence to avoid a vibration artifact. The system also includes suitable software and circuitry to implement the methods as described above.

DETAILED DESCRIPTION OF THE PREFERRED EMBODIMENTS

Figure 1:
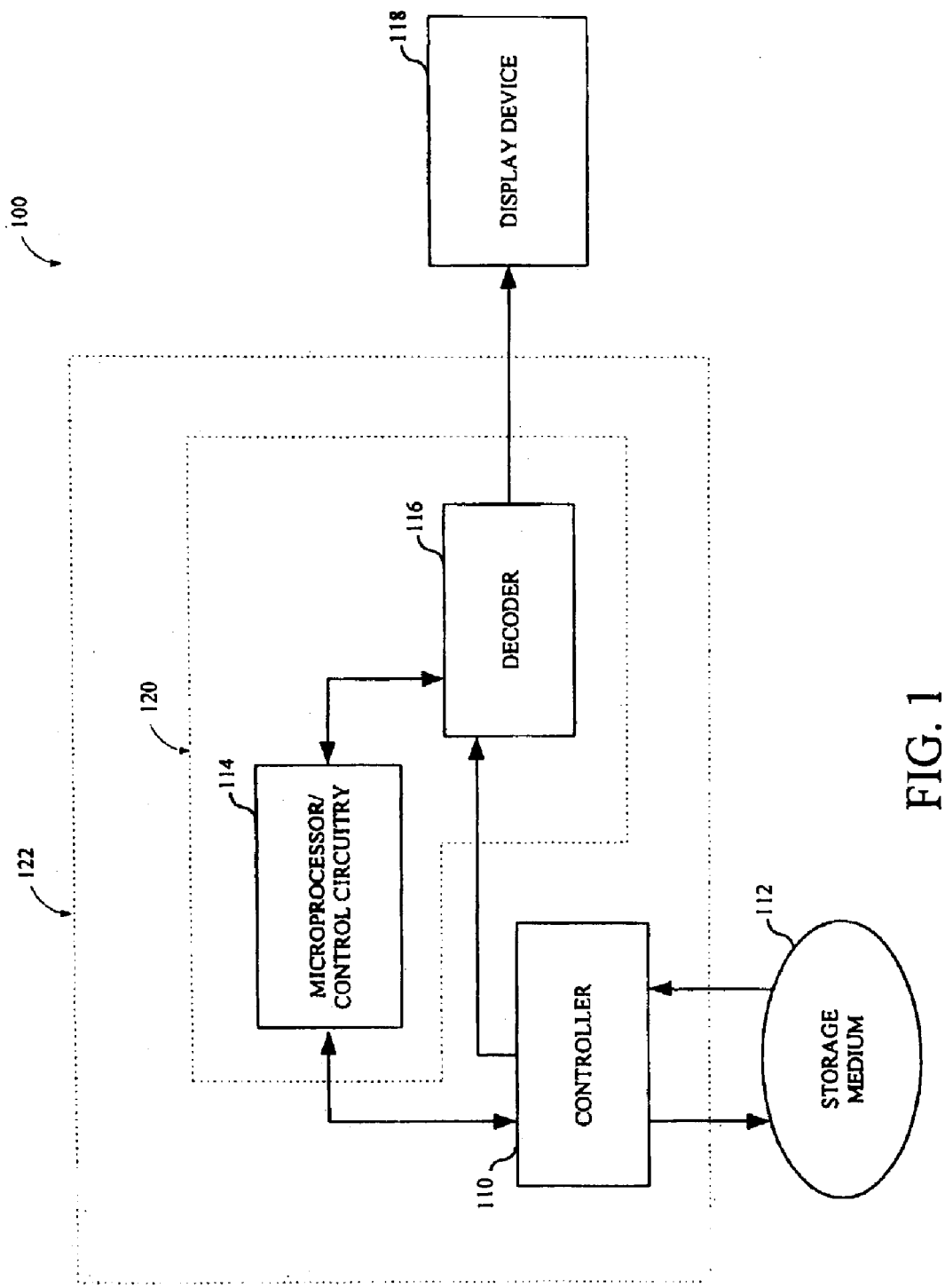
FIG. 1 is a block diagram of a system that can perform a slow video display trick mode in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a microprocessor 114, a decoder 116 and a display device 118. Control and data interfaces can also be provided for permitting the microprocessor 114 to control the operation of the controller 110 and the decoder 116. Suitable software or firmware can be provided in memory for the conventional operations performed by the microprocessor 114. Program routines can also be provided for the microprocessor 114 in accordance with the inventive arrangements.

It should be understood that all or portions of the microprocessor 114 and the decoder 116 can be a processor 120 within contemplation of the present invention. Further, all or portions of the controller 110, the microprocessor 114 and the decoder 116 can be a bitstream source 122 within contemplation of the present invention. In one arrangement, the decoder 116 can be under the direct control of the microprocessor 114. It should be noted, however, that the invention is not limited to this arrangement, as the invention can be practiced in other suitable systems.

In operation, the controller 110 can read a video signal containing a plurality of original pictures from the storage medium 112. In one embodiment and without limitation, these original pictures can be non-progressive pictures having at least two fields. The decoder 116 can decode these original pictures and transmit them to the display device 118, which can be, for example, a television.

In one arrangement, if the microprocessor 114 receives a trick mode command such as a slow motion trick mode command (forward or reverse), the microprocessor 114 can signal the decoder 116 to send repeats or duplicates of the original pictures to the display device 118. This process converts the video signal into a trick mode video signal having the original pictures and one or more repeated original pictures. Of course, the invention is not limited to slow motion trick modes, as it can also apply to a freeze trick mode.

During the trick mode command, the microprocessor 114 can signal the decoder 116 to transmit to the display device 118 the fields that comprise the original pictures and the repeated original pictures in accordance with a predetermined sequence to avoid a vibration artifact. Briefly, the microprocessor 114 can instruct the decoder 116 to transmit related fields of the original and repeated original pictures in such a manner that these related fields are consecutively displayed. Such a process can limit the alternate display of the fields that make up a particular picture being repeated. The overall operation of the invention, including examples of suitable predetermined sequences, will be discussed in greater detail below.

Slow Video Display Trick Mode

Figure 2:
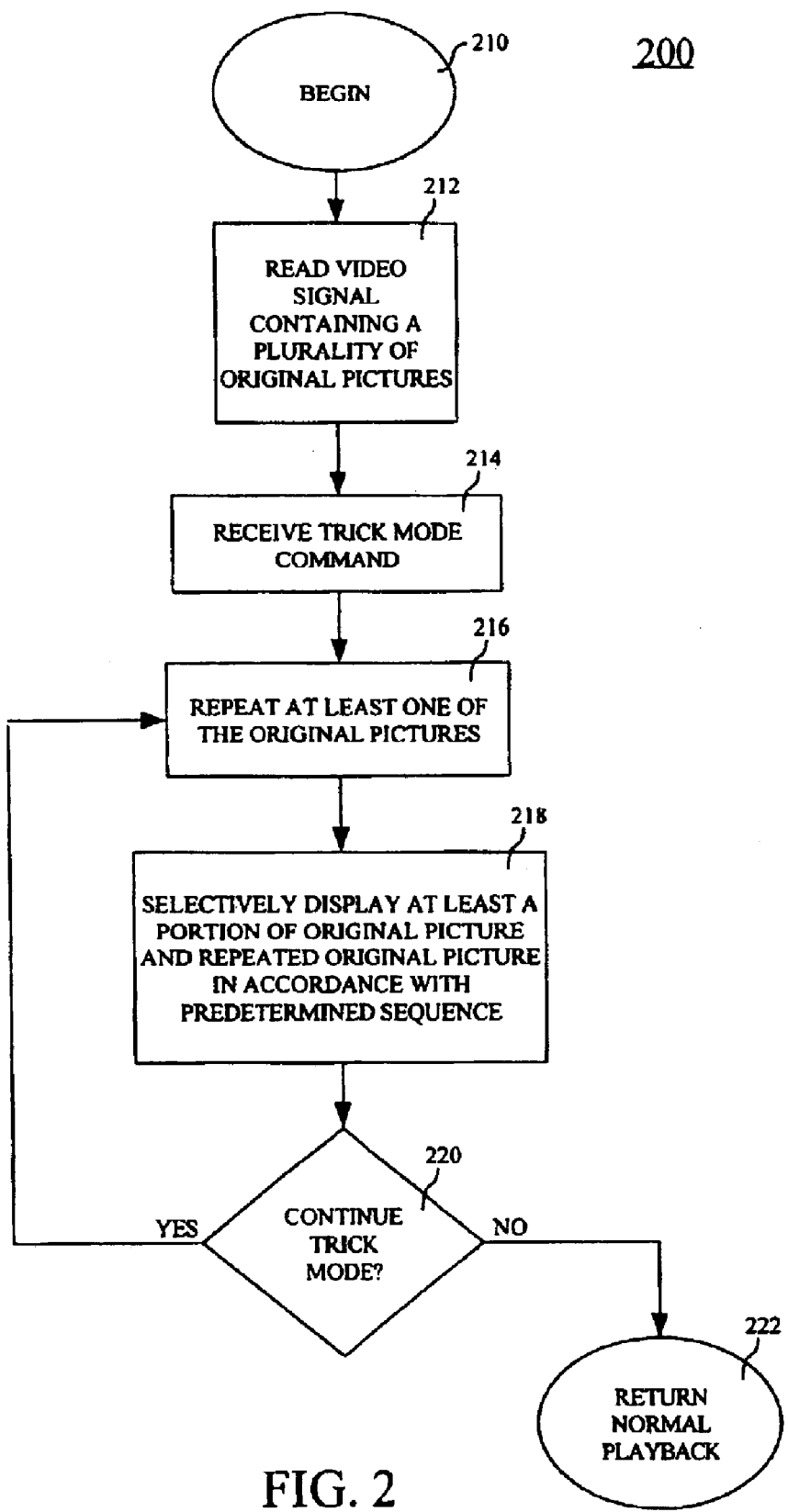
FIG. 2 is a method that illustrates an operation of performing a slow video display trick mode in accordance with the inventive arrangements.

FIG. 2 illustrates a method 200 that demonstrates one way to perform a trick mode, such as a slow motion or freeze trick mode, on a video signal. At step 210, the method 200 can begin. At step 212, a video signal containing a plurality of original pictures can be read. In one arrangement, the original pictures can be non-progressive pictures containing at least two fields. For example, one or more of the non-progressive pictures can have a top field and a bottom field.

As shown at step 214, a trick mode command can be received. For purposes of the invention, the trick mode command can be any command in which one or more of the original pictures are to be repeated, including a slow motion or freeze trick mode command. In addition, the slow motion trick mode command can be either a forward or reverse slow motion trick mode command. Following the receipt of the trick mode command, at least one of the original pictures can be repeated, as shown at step 216. Repeating the original pictures can convert the video signal to a trick mode video signal having the original pictures and one or more repeated original pictures.

At step 218, at least a portion of the original picture and at least a portion of the repeated original pictures can be selectively displayed in accordance with a predetermined sequence to avoid a vibration artifact. As an example, if the original pictures and the repeated original pictures contain top and bottom fields, the predetermined sequence can include the consecutive display of at least a group of the top fields and the consecutive display of at least a group of the bottom fields. Such a predetermined sequence is illustrated in FIG. 3A.

Figure 3A:
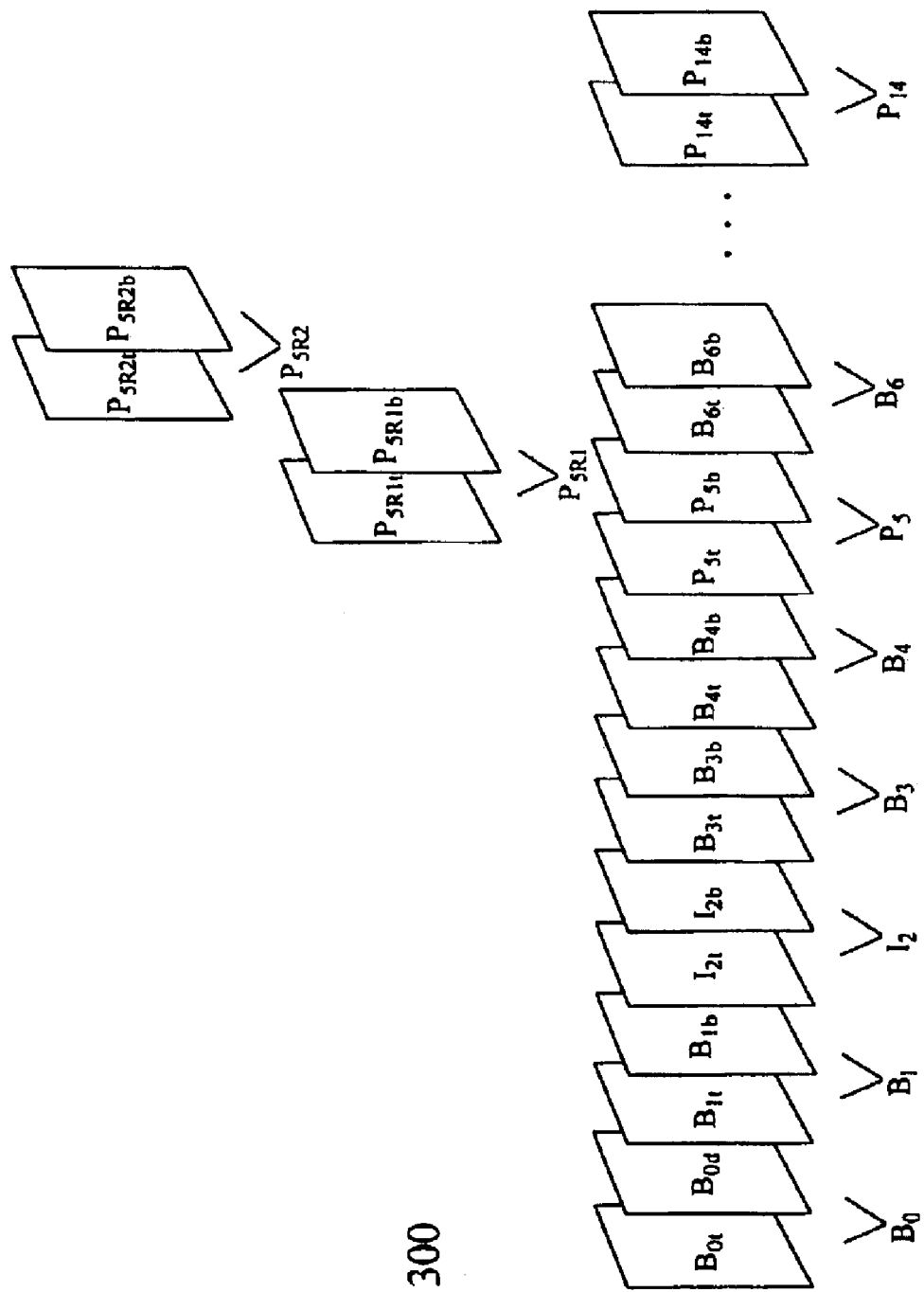
FIG. 3A is a portion of a group of pictures, including repeat pictures, in accordance with the inventive arrangements.

Referring to FIG. 3A, a portion of a typical group of pictures (GOP) 310 containing non-progressive pictures (original pictures) in display order having top and bottom fields is shown. The subscript numbers on the pictures indicate when each picture will be displayed—relative to the other pictures in the GOP—at a normal playback speed. The lowercase letter "t" can represent a top field, and the lowercase letter "b" can represent a bottom field. This GOP 310 can be one of many GOPs in a video signal. Although the invention is not limited to this particular GOP structure, the GOP 310 will serve to illustrate an example of the predetermined sequence discussed above.

In this example, a forward slow motion trick mode of 1/3x (1x represents normal playback speed) will be used to explain the predetermined example. Following the initiation of the trick mode, one of the original pictures can be repeated based on the desired trick mode speed. For example, if a forward slow motion trick mode is initiated on original picture $P_5$, then original picture $P_5$ and two repeats of original picture $P_5$—designated as $P_{5R1}$ and $P_{5R2}$—will be displayed during the trick mode command, where the uppercase letter "R" represents a repeat picture and the number following "R" indicates the display order of the repeated original picture. The repeated original pictures can also include top and bottom fields, which can be respectively identified as $P_{5R1t}$, $P_{5R1b}$, $P_{5R2t}$ and $P_{5R2b}$.

Figure 3B:
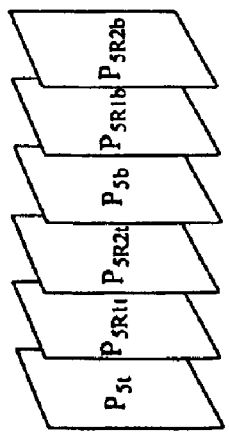
FIG. 3B illustrates several top and bottom fields in display order in accordance with the inventive arrangements.

In accordance with the inventive arrangements, the top fields of the original picture $P_5$ and the repeated original pictures, $P_{5R1}$ and $P_{5R2}$, can be displayed in consecutive or successive fashion followed by the consecutive or successive display of the bottom fields of these pictures. Thus, the chronological display can be as follows: $P_{5t}$, $P_{5R1t}$, $P_{5R2t}$, $P_{5b}$, $P_{5R1b}$ and $P_{5R2b}$. This display is shown in FIG. 3B. Displaying the pictures in this manner can help eliminate or greatly reduce the effects of a vibration artifact because the position of a moving object (if one so appears in these pictures) is stabilized for relatively longer periods of time as compared to the constant shifting of the object's position when top and bottom fields are alternately displayed in accordance with standard practice. That is, the top fields, which may contain a moving object in a specific location, can be consecutively displayed and only a single shift in the position of a moving object will appear when the bottom fields, which will display the object in a slightly different location, are consecutively displayed.

Referring back to FIG. 3A, this process can continue for the rest of the original pictures in the GOP 310. Because the playback speed is known, the groups of top fields can contain a predetermined number of top fields, and the groups of bottom fields can contain a predetermined number of bottom fields. For example and with respect to FIGS. 3A and 3B, because the playback speed is 1/3x, the group of top fields associated with picture $P_5$ will contain three top fields—the original top field $P_{5t}$ and the two repeated original top fields, $P_{5R1t}$ and $P_{5R2t}$.

Similarly, the group of bottom fields associated with picture $P_5$ can contain three bottom fields—the original bottom field, $P_{5b}$, and the two repeated bottom fields, $P5_{R1b}$ and $P_{5R2b}$. Accordingly, the predetermined number of top field or bottom fields can be equal to the denominator of the trick mode playback speed ratio for a slow motion trick mode. In this example, the number "3," the denominator in the playback speed ratio 1/3x, equals a predetermined number of three top fields and three bottom fields.

It must be noted, however, that the invention is not limited to this particular example, as the inventive arrangements can be applied to any other suitable GOP and any other suitable trick mode speed. Moreover, the predetermined number is in no way limited to this particular algorithm, as any suitable number of top fields and any suitable number of bottom fields can be consecutively displayed during a suitable trick mode command.

Also, those of ordinary skill in the art will appreciate that this example can also apply to a reverse slow motion trick mode in which the display order of the top and bottom fields can be reversed. Even so, it is irrelevant as to which group of fields is displayed first so long as there is at least a consecutive display of a portion of the fields to help limit the vibration artifact. For example, if the first field (in display order) in a reference picture is a bottom field and the second field (in display order) is a top field, the group of bottom fields can be displayed first followed by the group of top fields. As such, the invention is not limited to displaying the group of top fields first, as a bottom field may be the first field in a reference picture.

As another example, if the fields include top fields and bottom fields, the predetermined sequence can include the consecutive display of only one of a group out of a group of top fields or a group of bottom fields. A freeze or pause trick mode will be used to explain this particular example. During a freeze trick mode, an original picture and a number of repeats of the original picture are displayed. As the length of the trick mode is usually unknown, the number of pictures to be displayed is typically not known either. As a result and in accordance with the inventive arrangements, only the top fields or only the bottom fields associated with an original picture and the repeated original pictures can be shown.

Figure 3C:
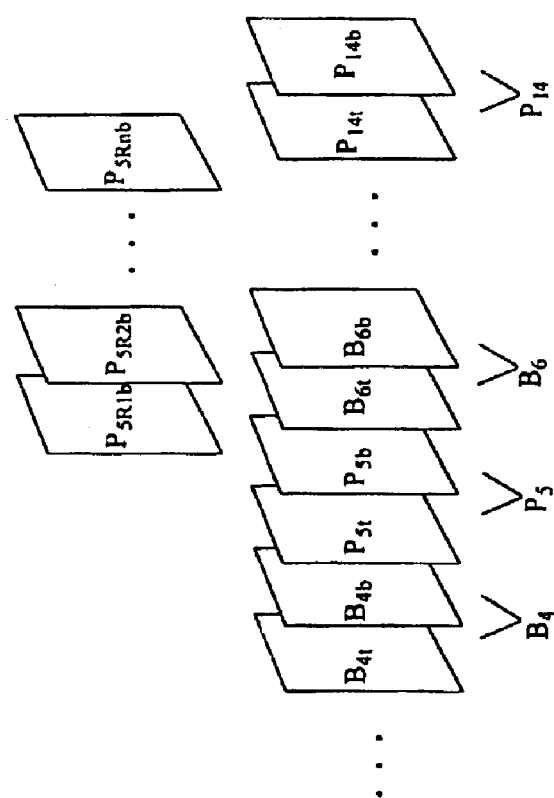
FIG. 3C is another portion of a group of pictures, including several repeated bottom fields, in accordance with the inventive arrangements.
Figures 3D, 3E:
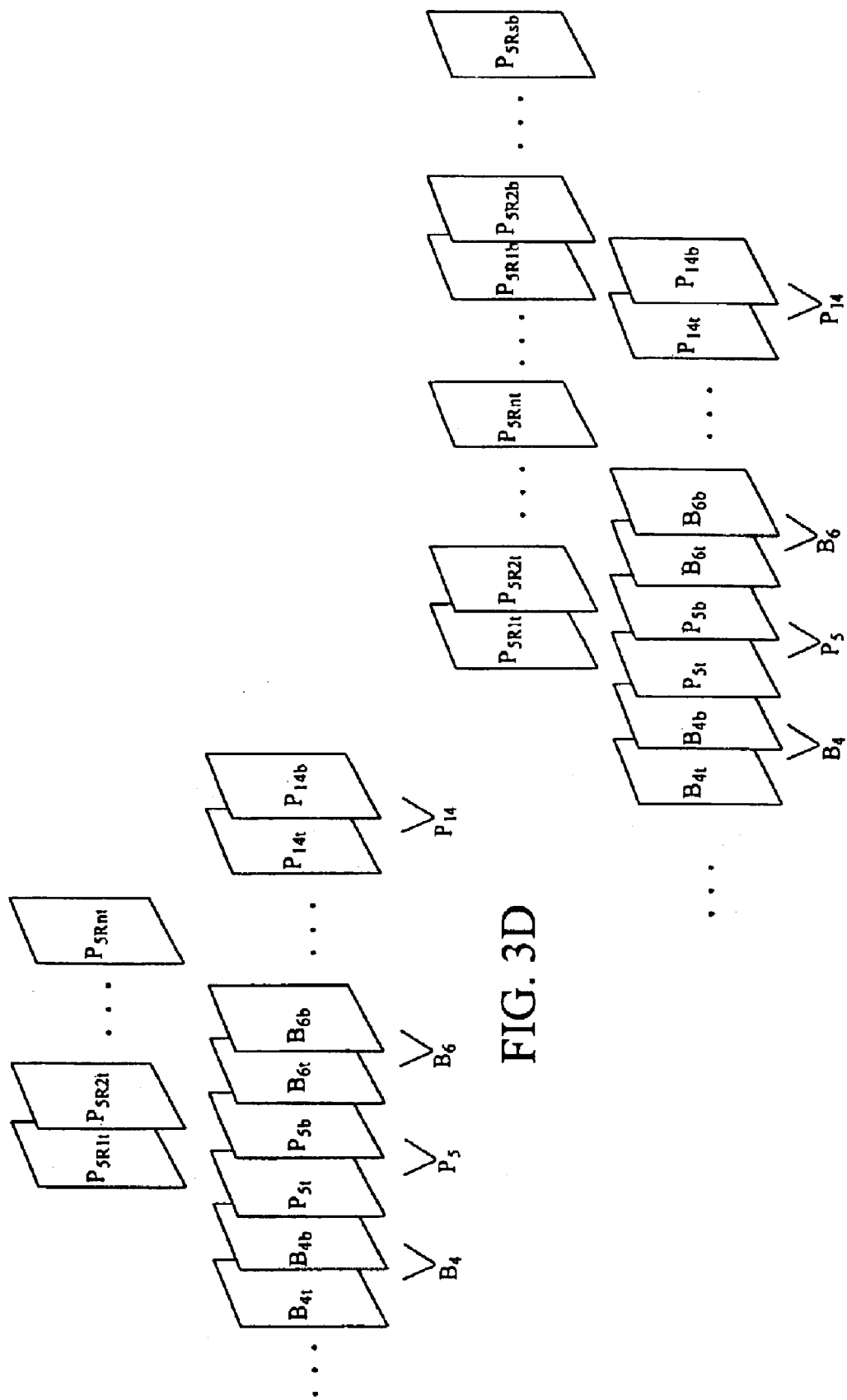
FIG. 3D is another portion of a group of pictures, including several repeated top fields, in accordance with the inventive arrangements.
FIG. 3E is another portion of a group of pictures, including several repeated top fields and several repeated bottom fields, in accordance with the inventive arrangements.

For example and as shown in FIGS. 3C and 3D, if a freeze trick mode were initiated on picture $P_5$, the bottom field $P_{5b}$ and repeats of that bottom field, $P_{5R1b}$, $P_{5R2b}$ ... $P_{5Rnb}$, can be displayed during the trick mode, where the letter "n" represents the final number of repeated original bottom field. Alternatively, the top field $P_{5t}$ and repeats of that top field (not shown) could be displayed during the trick mode.

Although described in terms of a freeze trick mode, this predetermined sequence can also apply to slow motion trick modes. In fact, the example can apply to either forward motion or reverse motion slow motion trick modes. Moreover and as explained earlier, the bottom field of the reference picture may be, in some instances, the first field (in display order) of the reference picture.

In another arrangement, the predetermined sequence can include the consecutive display of one of the groups of fields for a predetermined number of times and the consecutive display of the other group of fields for the remainder of the trick mode. A freeze trick mode will be used to explain this example, although this process can be practiced with other trick modes such as a forward or reverse slow motion trick mode. Referring to FIG. 3D, if a freeze trick mode is initiated on picture $P_5$, the top field $P_{5t}$ and repeats of that top field, $P_{5R1t}$, $P_{5R2t}$ ... $P_{5Rnt}$, can be displayed, where the letter "n" is equal to the total number of repeat top fields in this group that are displayed. This number can be a predetermined number but is in no way limited to any particular value.

Following the display of the group of top fields, bottom field $P_{5b}$ can be displayed, and the repeats of that bottom field, $P_{5R1b}, P_{5R2b} \ldots P_{5Rsb}$, can be displayed during the remainder of the trick mode. The letter "s" can represent the total number of repeat bottom fields that are displayed during the trick mode, which can be a predetermined number but is not so limited. If the playback speed is known, then "s" can equal the number of repeat bottom fields needed to complete the trick mode display for the original bottom field from which the repeat bottom fields are generated.

In this instance, "s" can equal a predetermined number whose value is determined from the number of top fields that are displayed during the trick mode. For example, if the playback speed of a slow motion trick mode is 1/5× and three top fields are displayed (the top field of the original picture and two top fields from the repeated original pictures), seven bottom fields should be displayed to complete the repeated display for the original picture according to the playback speed. These bottom fields can include the original bottom field and six repeat bottom fields. As such, "s" can equal the number six in this example. It is understood, however, that the invention is not limited to this particular example.

In addition, if the playback speed is not known, then "s" can equal the number of repeat bottom fields that are displayed until the trick mode command is rescinded. Such an instance may occur, for example, during a freeze trick mode. In either arrangement, the number of shifts in the position of a moving object in picture $P_5$ (if one so existed) is limited to one, thereby reducing the effects of the vibration artifact. The invention, however, is not limited to this example, as other display sequences are available, including one where the bottom fields can be displayed for a predetermined number of times and the top fields can be displayed during the rest of the trick mode. Also, the above discussion is also relevant if the first field of the reference picture is a bottom field instead of a top field.

Referring back to the method 200 of FIG. 2, at decision block 220, it can be determined whether the trick mode will continue. If yes, the method 200 can resume at step 216. If not, the method 200 can stop at step 222, and normal playback can resume.

Although the present invention has been described in conjunction with the embodiments disclosed herein, it should be understood that the foregoing description is intended to illustrate and not limit the scope of the invention as defined by the claims.

What is claimed is:

1. A method of performing a trick mode on a video signal containing a plurality of original pictures, comprising the steps of:
   in response to a trick mode command, selectively repeating at least one of the original pictures to convert the video signal to a trick mode video signal having the original pictures and at least one repeated original picture; and
   selectively displaying at least a portion of the original picture and at least a portion of the repeated original pictures in accordance with a predetermined sequence to avoid a vibration artifact, wherein each original picture and each repeated original picture contain at least two fields, and wherein the fields include at least top fields and bottom fields and the predetermined sequence includes the consecutive display of at least a group of top fields from the original picture and the repeated original pictures and the consecutive display of at least a group of bottom fields from the original picture and the repeated original pictures.

2. The method according to claim 1, wherein the trick mode command is a slow motion trick mode command.

3. The method according to claim 2, wherein the slow motion trick mode command is a forward slow motion trick mode command.

4. The method according to claim 2, wherein the slow motion trick mode command is a reverse slow motion trick mode command.

5. The method according to claim 1, wherein the trick mode command is a slow motion trick mode command, the group of top fields contains a predetermined number of the top fields and the group of bottom fields contains a predetermined number of the bottom fields.

6. The method according to claim 5, wherein each of the predetermined numbers is equal to a denominator in a playback speed ratio for the slow motion trick mode command.

7. The method according to claim 1, wherein the predetermined sequence further includes the consecutive display of the group of top fields for a predetermined number of times and the consecutive display of the group of bottom fields for the remainder of the trick mode command.

8. The method according to claim 1, wherein the predetermined sequence further includes the consecutive display of the group of bottom fields for a predetermined number of times and the consecutive display of the group of top fields for the remainder of the trick mode command.

9. The method according to claim 1, wherein the fields include at least top fields and bottom fields and the predetermined sequence includes the consecutive display of only one group among a group of top fields or a group of bottom fields.

10. The method according to claim 1, wherein the trick mode command is a freeze trick mode command.

11. A system for performing a trick mode on a video signal containing a plurality of original pictures, comprising:
   a controller for reading data from a storage medium and outputting the video signal containing the plurality of original pictures; and
   a processor, wherein the processor is programmed to:
      in response to a trick mode command, selectively repeat at least one of the original pictures to convert the video signal to a trick mode video signal having the original pictures and at least one repeated original picture; and
      selectively display at least a portion of the original pictures and at least a portion of the repeated original pictures in accordance with a predetermined sequence to avoid a vibration artifact, wherein each original picture and each repeated original picture contain at least two fields, and wherein the fields include at least top fields and bottom fields and the predetermined sequence includes the consecutive display of at least a group of top fields from the original picture and the repeated original pictures and at least a group of bottom fields from the original picture and the repeated original picture.

12. The system according to claim 11, wherein the trick mode command is a slow motion trick mode command.

13. The system according to claim 12, wherein the slow motion trick mode command is a forward slow motion trick mode command.

14. The system according to claim 12, wherein the slow motion trick mode command is a reverse slow motion trick mode command.

15. The system according to claim 11, wherein the trick mode command is a slow motion trick mode command, the group of top fields contains a predetermined number of the top fields and the group of bottom fields contains a predetermined number of the bottom fields.

16. The system according to claim 15, wherein each of the predetermined numbers is equal to a denominator in a playback speed ratio for the slow motion trick mode command.

17. The system according to claim 11, wherein the predetermined sequence further includes the consecutive display of the group of top fields for a predetermined number of times and the consecutive display of the group of bottom fields for the remainder of the trick mode command.

18. The system according to claim 11, wherein the predetermined sequence further includes the consecutive display of the group of bottom fields for a predetermined number of times and the consecutive display of the group of top fields for the remainder of the trick mode command.

19. The system according to claim 11, wherein the fields include at least top fields and bottom field pictures and the predetermined sequence includes the consecutive display of only one group among a group of top fields or a group of bottom fields.

20. The system according to claim 11, wherein the trick mode is a freeze trick mode command.

* * * * *